Jan. 26, 1960  A. G. GRIPARIS  2,922,523
FLOUR SIFTER
Filed April 7, 1958  2 Sheets-Sheet 2
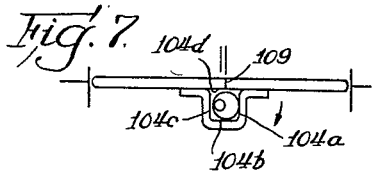
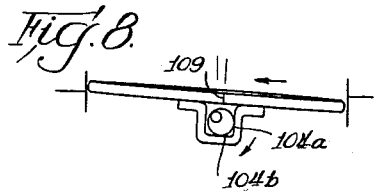
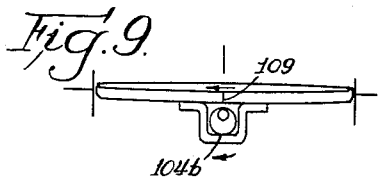
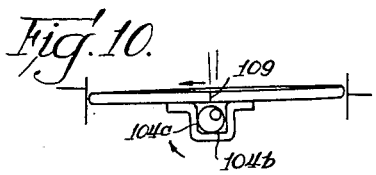
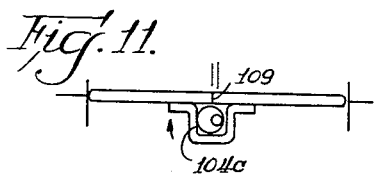
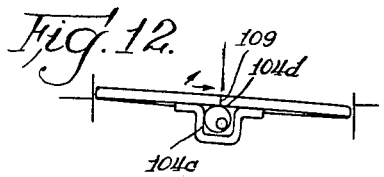
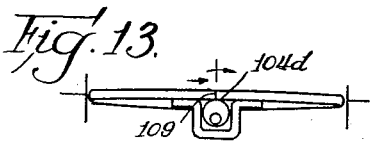
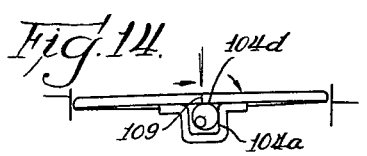
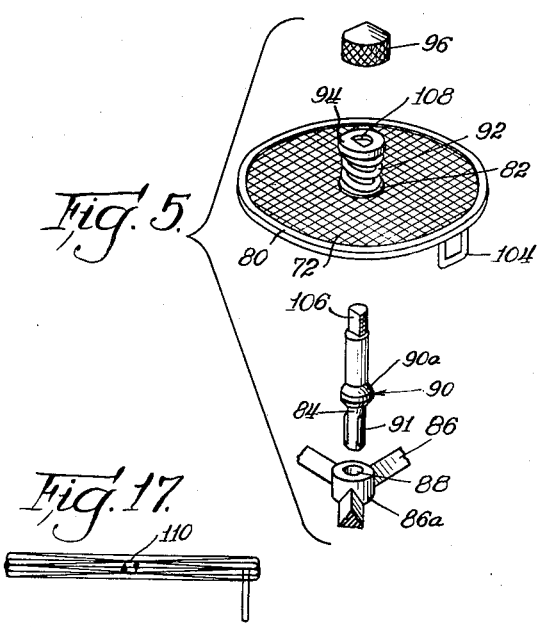
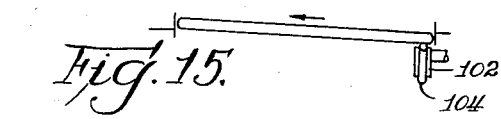
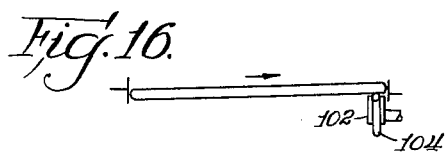
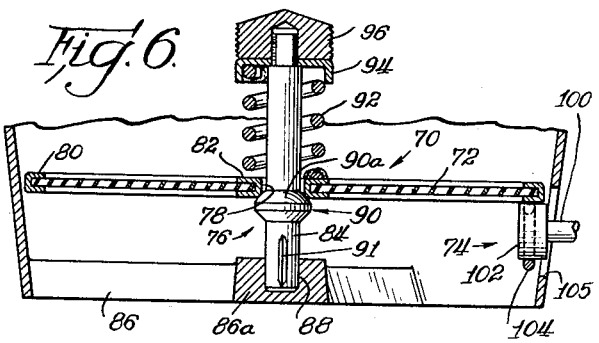
INVENTOR.
Andrew George Griparis
BY
Carlsen, Pitzner, Hubbard & Wolfe
Att'ys.

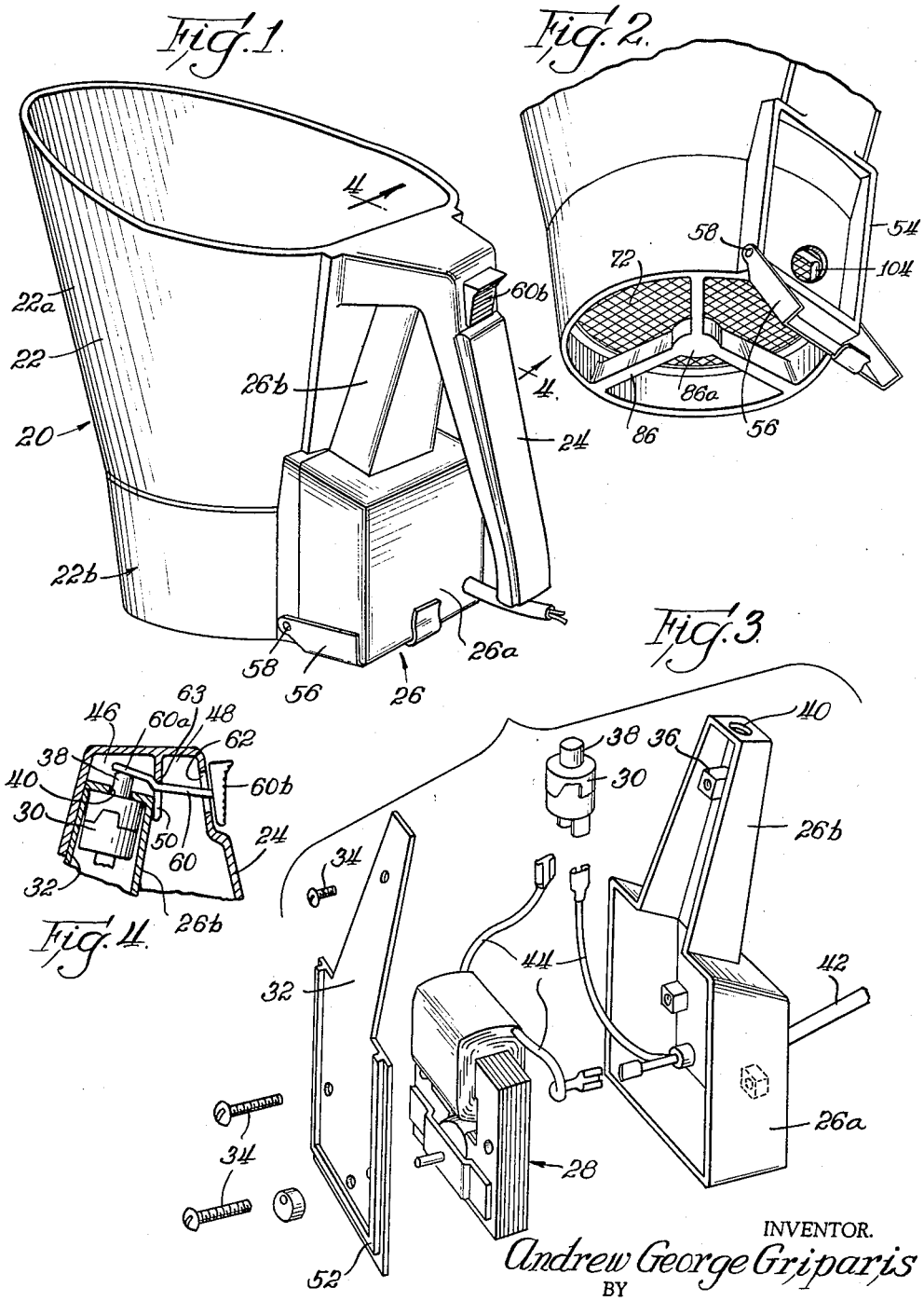

United States Patent Office 2,922,523
Patented Jan. 26, 1960

2,922,523

FLOUR SIFTER

Andrew George Griparis, Joliet, Ill.

Application April 7, 1958, Serial No. 726,911

9 Claims. (Cl. 209—327)

The present invention relates generally to flour sifters and more particularly to a new and improved portable flour sifter adapted especially for household kitchen use.

Sifting of flour in the household kitchen for the purpose of aerating the flour prior to use in baking has for many years been an awkward, time consuming, and untidy process. Various shapes and sizes of screens, sieves and the like have been employed in devices manipulatable by hand for accomplishing this function but these have given uniformly poor sifting results aside from their inconvenience in use. In some instances multi-stage hand sifters have been devised, such as the so-called "triple sifters" now commercially available, but these have resulted in only limited improvement in sifting quality. Yet even today manual devices for flour sifting are still by far the most commonly used.

Attempts have been made to apply actuating devices, such as electric vibrators and the like, to conventional flour sifting screens but such expedients have been invariably unsatisfactory. Vibrator actuated screens have been found to be noisy in their operation, extremely sensitive to misadjustment of component parts and not satisfactory in terms of the rate of sifting and degree of flour aeration attained.

It is an object of the present invention to overcome the disadvantages heretofore enumerated by providing a flour sifter which produces an extremely high degree of aeration in the sifted flour in a minimum length of time. An allied object is to provide a flour sifter in which rapid and vigorous movement of a special character is imparted to a sifting screen to effect quick and thorough sifting action. A further allied object in this regard is to provide such a sifter requiring only a single sifting stage so that thorough sifting action is accomplished without re-sifting or multi-pass treatment.

Another object of the invention is to provide a flour sifter which is simple, small, extremely compact in size, and easily portable to enhance its utility as a kitchen appliance.

Still another object is to provide a flour sifter which is safe and quiet in operation, easily and quickly cleaned after use, economically manufactured and which requires a minimum of care in operation and maintenance.

Another object of the invention is to provide a flour sifter which eliminates messy and untidy sifting conditions by permitting pin-point sifting into a measuring cup or the like without scattering flour loosely around the surrounding table area.

Yet another object is to provide a flour sifter which is neat and pleasing in appearance.

A further object is to provide a labor-saving flour sifter which may be operated by a housewife using only one hand, thus leaving the other hand free for measuring and adding baking ingredients and the like.

Other objects and advantages of the invention will become apparent upon reference to the following description, taken in conjunction with the accompanying drawings in which:

Fig. 1 is a perspective view of an illustrative flour sifter which may be used in practicing the invention.

Fig. 2 is a fragmentary perspective view looking upwardly at the lower portion of the flour sifter shown in Fig. 1 but from which the motor and switch housing has been removed.

Fig. 3 is an exploded perspective view showing the electric motor and switch housing and components which form a part of the illustrative flour sifter.

Fig. 4 is a fragmentary vertical sectional view taken along the line 4—4 in Fig. 1.

Fig. 5 is an exploded perspective view showing the sifting screen assembly employed within the illustrative flour sifter.

Fig. 6 is an enlarged, fragmentary, vertical sectional view taken along a diametral line extending across the sifting screen and screen assembly shown in Fig. 5, and showing the screen assembly mounted within the illustrative flour sifter.

Figs. 7–14 are schematic stop-motion views showing various positions of the illustrative sifting screen and screen actuating means with respect to a horizontal plane during operation of the sifter.

Figs. 15 and 16 are schematic stop-motion views corresponding to but taken at a point spaced 90° from those shown in Figs. 9 and 13, respectively.

Fig. 17 is a schematic composite view similar to Figs. 15 and 16 showing several positions through which a single point on the edge of the sifting screen passes in tracing a closed path of motion.

While the invention has been described in connection with a certain preferred embodiment thereof, it will be understood that it is not intended to limit the invention thereto but rather it is intended to cover all alternative constructions and modifications falling within the spirit and scope of the appended claims.

Turning now to the drawings, there is shown in Fig. 1 a flour sifter 20 which is constructed of any suitable material, such for example as conventional form sustaining plastics or light gauge metal. In this case the sifter 20 is formed of a suitable molded plastic material and comprises a one-piece canister or shell 22 including a handle 24 integrally formed therewith, and a unitary motor and switch mechanism housing 26 detachably secured to the canister.

As shown, the canister or shell 22 is of generally cylindrical configuration having an upper portion 22a for holding compacted or unsifted flour or the like and a lower sifting portion 22b. The sifter 20 is provided with a large open top to facilitate entry of flour to be sifted and is preferably inwardly tapered somewhat from top to bottom to facilitate movement of the flour downwardly therethrough. The bottom end of the cylinder 20 is also substantially completely open to facilitate passage of sifted flour therethrough and into a suitable measuring cup or other container.

The motor and switch mechanism housing 26 (see Figs. 1, 3) comprises a lower box shaped portion 26a which houses therein a suitable shaded-pole type electric motor 28 and an integral relatively narrow and somewhat elongated upper portion 26b which houses a motor switch mechanism 30. As shown in Fig. 3, the housing 26 has an open access side which is normally closed by a closure plate 32 secured thereto by suitable screws 34 or the like which are received in screw-threaded bosses 36 formed on the inner surface of the opposing wall of the housing. To facilitate fitting together of the motor and switch housing 26 with the canister 22 the upper portion 26b of the housing is reclined (from the plane of the open access side of the lower housing portion 26a) at an angle approximately complementary to the angle of taper of the canister.

As will be seen (Figs. 3 and 4), a push-type switch button 38 carried by the switch mechanism 30 extends upwardly (spring biased) through a suitable opening 40 in the top surface of the upper housing portion 26b for reception within the canister handle 24. An electric cord 42 adapted to be connected with an electric wall socket (not illustrated) is shown extending into the lower housing portion 26a, and lead wires 44 are provided for connecting the switch mechanism 30 and electric motor 28 with the cord 42.

Upon reference to Figs. 1–4, it will be seen that the switch and motor housing 26 is normally positioned under the canister handle 24 and locked tightly and compactly against the side of the canister 22. As thus assembled the top of the upper portion 26b of the motor and switch housing, with the switch button 38 protruding therefrom, is received in one (46) of a pair of recesses 46, 48 (Fig. 4) defined by a depending separator or divider 50 integrally formed in the underside of the canister handle 24. As will be seen, the handle recess 46 is sized to receive the top of the upper portion 26b of the housing in a wedge fit while yet limiting upward movement of the housing under the handle so that some free space remains above the switch button 38. In this condition it will be observed that a plurality of locating ribs 52 (arranged in the configuration of a U) carried on the outer surface of the housing closure plate 32 are positioned to snugly fit within correspondingly arranged ridges 54 integrally formed along the outer surface of the canister 22 beneath the handle 24 (see Fig. 2). A spring clip fastening member 56, which is pivoted at 58 to the bottom of the canister ridges 54, is provided for snap-type engagement with the bottom surfaces of the lower housing portion 26a to thereby firmly hold the housing 26 in place against the canister while yet permitting ready manual disengagement of the parts when desired.

For actuating the switch button 38, a thumb operated lever 60 (esp. Fig. 4) is provided in the upper portion of the handle 24, with one end 60a of the lever extending into the free space in handle recess 46 in overlying relation to the push button and the other lever end 60b extending outside the handle through an opening 62 therein. The actuating lever 60 is offset intermediate its ends so as to form a shoulder for engagement with the notched underside of the divider 50 to form a fulcrum 62 therewith. As shown, the outer end 60b of the operating lever is enlarged and shaped for thumb engagement by the housewife, the various parts being so sized that the lever is securely held within the handle 24 at all times. Thus upward motion of the thumb portion 60b of the lever is effective to swing the lever end 60a downwardly about the fulcrum 63 to thereby depress the switch button 38, which starts the electric motor 28. Manual release of the lever portion 60b permits the upwardly biased switch button 38 to return to an "off" position to thereby shut off the motor.

In carrying out the invention a flour sifting screen assembly 70 including a centrally supported screen member 72 is provided within the lower portion 22b of the canister, and special and unusually effective screen actuation is accomplished through screen actuating means 74 interposed between the screen and the motor 28 housed within the switch and motor housing 26. As will be described in detail, the screen actuation attained in the preferred form of the invention consists of oscillatory motion in a horizontal plane about the screen center, and an additional oscillatory tilting motion of the screen about its center (from horizontal to skewed screen planes), which latter motion is superimposed upon the former horizontal motion.

In the preferred form of the invention, one embodiment of which is illustrated in the drawings, the screen assembly 70 comprises the screen 72 and means 76 for centrally supporting the screen in the lower portion of the canister 22. As shown, the screen 72 is substantially flat and circular in shape, being formed of any suitable wire mesh or of perforated or expanded metal or the like. The screen outer diameter is slightly less than the inner diameter at the lower portion 22b of the canister to prevent by-passing of compacted flour around the screen edge while at the same time facilitating freedom of screen movement within the canister under actuation.

An opening 78 is provided in the center of the screen 72 to facilitate screen mounting and support within the canister. For strength and to aid in sustaining its flat form, the screen 72 is encased at its outer periphery and surrounding the inner opening 78 with large and small diameter binding rings 80 and 82, respectively. The rings 80, 82 are of U-shaped cross-section formed of suitable light gauge metal or the like and may be crimped or otherwise secured to the wire mesh screen.

From the drawings (esp. Figs. 5 and 6) it will be seen that the screen support means 76 includes a substantially vertically disposed screen support member 84 which is fixed within the canister 22 on a tripod or spider structure 86 integrally formed with the extreme lower end of the canister. As shown, the spokes of the tripod 86 are of generally triangular cross-section with the apex of the triangle facing upwardly so as not to impede discharge of sifted flour from beneath the screen 72. In this instance the screen support member 84 is shaped generally as an elongated round stud, having a portion 90 of enlarged diameter disposed intermediate its ends. The lower end of the stud 84 is supportingly received in a recess or counterbore 88 provided in a central hub 86a of the tripod 86. Suitable means such as splines 91 integrally formed with the lower end of the screen support stud 84 are provided for preventing rotation thereof with respect to the tripod hub 86a.

As will be seen, the enlarged portion 90 of the screen support member 84 directly engages and supports the screen 72 within the canister. It is perhaps appropriate to further describe the screen 72 and screen supporting means 76 in terms of assembly of the component parts within the canister. The screen 72 is inserted into the canister 22 horizontally such that the inner screen ring or grommet 82 is slipped over the upper end of the screen support member 84. This end of the support stud 84 is of somewhat smaller diameter than the inner diameter of the ring 82 so that the screen easily moves downwardly on the stud until coming to rest on the enlarged stud portion 90, which is in turn slightly larger in diameter than the opening defined by the ring 82.

The screen 72 is so supported within the canister 22 that the screen center is substantially fixed and held non-movable while means is provided to facilitate at least limited universal movement of the flat screen about its center. Thus the enlarged portion 90 of the support stud 84 is provided with a downwardly tapered upper surface 90a which in this case is of frusto-conical shape. As stated, the undersurface of the screen ring 82 bears downwardly against the frusto-conical stud surface 90a, and this relationship plus the oversize condition of the ring 82 with respect to the upper portion of the stud 84 affords universal movement of the screen 72 about the support member. The resulting ball joint formed by the elements 82 and 90a is thus effective to permit oscillatory movement of the screen 72 about the stud 84 in a horizontal plane and tilting movement of the screen into various planes skewed with the horizontal as well as combinations of these two types of motion.

For holding the center of the screen 72 securely down upon the support bearing 90 resilient means in the form of a compression spring 92 is provided above the screen and surrounding the upper portion of the support 84. As shown, the compression spring 92 may be suitably secured as by welding or the like at its lower end to the top surface of the inner screen ring 82, and may be similarly secured at its upper end to a downwardly flanged circular cap 94. The extreme upper end of the support stud 84 is screw threaded for receiving an internally threaded thumb-nut 96 so that when the nut is in place the spring 92 is compressed slightly to thereby resiliently urge the screen 72 downwardly onto stud bearing surface 90a.

The illustrative screen actuating means 74 is effective to impart to the screen both oscillatory motion in a horizontal plane and tilting motion about the screen center in planes skewed from the horizontal. As shown in the drawings (see especially Figs. 3, 6), the actuating means 74 comprises a cam and follower connection between the outer edge of the screen 72 and an output shaft 100 extending from the electric motor 28 in parallel and downwardly offset relation to the horizontal plane of the screen. Thus the cam 102 is eccentrically mounted on the end of the motor output shaft 100, with the plane of the cam arranged normal to the horizontal plane of the screen 72. The motor shaft 100 is of such length that when the sifter is completely assembled the plane of the cam 102 is vertically aligned with and engageable with a cam follower 104 which is dependingly fixed to the underside of the outer edge of the screen 72. A suitable opening 105 is provided in the lower portion 22b of the canister wall of somewhat larger size than that of the cam to permit entry of the shaft 100 and cam 102 into the canister and into position beneath the screen. This also facilitates removal of the cam when the housing 26 is disengaged from the canister 22 for cleaning or the like.

Attention is drawn to the structural details of the illustrative cam and follower 102, 104. A plate-type cam 102 is shown, shaped as a circular disc which presents a narrow outer edge or cam surface for engagement with the follower 104. The follower 104 comprises an enclosed and substantially square-shaped drive loop formed by securing as by welding or brazing a suitable U-shaped member or stirrup of relatively heavy gauge wire or the like to the underside of a segment of the outer screen reinforcing ring 80. Preferably the cam 102 is formed of a suitable non-metallic material, i.e. nylon or other plastic material, to minimize noise that might otherwise accompany interrupted engagement as between metallic parts. It will be observed that means is provided for assuring proper orientation of the follower 104 within the canister 22 with respect to the cam 102 after the parts have been disassembled for cleaning or the like in the form of a flat 106 provided on the screw-threaded extreme upper end of the screen supporting stud 84 and a half-moon shaped opening 108 in the cap 94 which fits downwardly over the stud. Since the cap 94, compression spring 92 and screen 72 in the illustrative screen assembly are secured together as a unit, the single possible position of the cap upon the stud 84 assures proper positioning of the folower 104 opposite the canister opening 105.

As will be seen from Figs. 7-14, the inner spacing of opposite sides of the drive loop 104 is slightly greater than the diameter of the cam 102 so that the latter fits into the loop with slight clearance on all sides. This is to accentuate the change of direction of motion of any point on the screen 72 during screen actuation by providing enough slack in the connection between cam and follower to suddenly and regularly jar the screen in the direction of motion.

The screen motion attained in the illustrative embodiment of the invention is best described in connection with Figs. 7-17 of the drawings, which are schematic views of the screen 72 from an edgewise direction and showing the positions of the cam and follower which correspond to given screen positions. Figs. 7-14 show the various positions of the parts in terms of 45° intervals of rotation of the cam 102. For purposes of the following description, the 4 sides of the follower loop 104 are referred to respectively as 104a (the vertical side on the right as viewed in the drawings), 104b (the bottom horizontal side), 104c (the vertical side on the left as viewed in the drawings) and 104d (the top horizontal side formed by the underside of the screen ring 80).

Fig. 7 shows the screen 72 in a horizontal starting position, with the circular cam 102 centered beneath the midpoint 109 of the follower side 104d (note that the center of the motor output shaft 100 is horizontally offset to the left with respect to the midpoint 109 due to the eccentric mounting of the cam). In this position the cam 102 lightly engages the sides 104a and 104b of the follower loop, there being clearance between the cam and the other two sides of the loop.

In Fig. 8 clockwise motion of the cam 102 has been initiated and as will be seen, the follower sides 104a and 104b are positively driven by the cam to thereby shift the screen angularly from right to left horizontally as viewed in the drawings, as well as to force the edge of the screen at the right side downwardly to thereby tilt the screen into a plane which is skewed with the horizontal. As noted above, the center of the screen 72 remains fixed but tilting and angular motion in a horizontal plane are afforded by the ball joint central screen mounting. The screen closely follows the askew motions imparted to it by the cam and follower due to the resilient spring support provided.

In Figs. 9 and 15 the cam has revolved 90° from the initial position shown in Fig. 7 and now engages the bottom side 104b of the follower. At this point the screen 72 reaches its maximum degree of tilt (downwardly on the cam and follower side) and the screen motion is made up substantially entirely of horizontal force components (from right to left). The center of the output shaft 100 is now vertically aligned with the follower midpoint 109. In Fig. 10, after 135° of cam motion, the edge of the screen 72 overlying the cam 102 begins to lift due to engagement of the cam with the follower side 104c.

In the position shown in Fig. 11 the screen has attained a level position again, as in Fig. 7, except that the cam has revolved 180° such that the shaft 100 is horizontally offset slightly to the right of the follower midpoint 109, and the cam just lightly engages the follower side 104c.

Fig. 12 corresponds with Fig. 8, and Figs. 13 and 16 with Fig. 9 except for the 180° difference in cam position, and consequent opposite direction of tilt of the screen. Similarly Fig. 14 corresponds with Fig. 11 except that the edge of the screen on the side of the cam and follower is slightly above rather than slightly below the normal level horizontal plane of the screen.

Thus, the cam and follower arrangement 102, 104 serves to impart to the screen 72 not only oscillatory motion in a horizontal plane but also tilting up and down motion about the central screen supporting means 84. Moreover, the tilting motion which is imposed upon the back and forth oscillatory motion is uniform in character such that successive points around the outer edge of the screen 72 progressively trace identical closed paths of motion under continued screen actuation. It will be observed that in engaging successively the straight, tangential sides of the follower 104, the cam 102 gives the follower positive motion throughout 360° of cam movement.

By use of the circular shaped cam 102 and substantially square-shaped follower loop 104 it is found that any point chosen on the outer edge of the screen 72, or anywhere on the screen, will trace a circular path (aligned in a near vertical plane) in responding to one revolution of the cam. This is apparent upon reference to Fig. 17, which is a composite edge view of the screen 72 showing several positions thereof attained in response to cam direction. There is shown schematically a closed circular path 110 traced by a single point on the screen edge during 360° of cam movement. It will of course be observed that the magnitude of the radius of this circular path 110 will be directly proportional to the amount of offset or eccentricity in the cam mounting. Stated in another way, the amount of cam eccentricity determines the vertical swing or degree of screen tilting from the horizontal. As concerns the latter, it will be apparent that any point on the screen moves up and down through a generally vertical arc about the center of the screen during one revolution of the cam. The angular length of this arc will of course be the same for all points on the screen while the absolute arc length will vary in proportion to the radial distance of a given point from the center of the screen.

Due to the relatively fixed central mounting of the screen 72, the motion of points spaced 180° apart around the motion screen will be symmetrical about the center. Thus, considering the normal level horizontal position of the screen to constitute a reference plane, the distances from this plane to points spaced equidistant from the screen center and 180° apart around the screen during screen actuation will be the same in magnitude but opposite in direction, i.e. the points will be the same distance from but on opposite sides of the reference plane.

It is found that this action of the shifting screen in constantly moving up and down as well as back and forth about the screen center is extremely effective in separating compacted flour particles from above the screen and dispersing these into the air immediately below the screen to produce a high degree of flour aeration.

Of course other means than those shown may be employed for imparting the desired motion to the screen. These might take the form of other types of eccentric operation, such for example as using an offset crank type actuator or the like, or other means may be used as desired providing that the requisite screen actuation is attained. Various cam and follower arrangements may also be employed in lieu of that illustrated herein. The nature of the path traced by a point on the screen will in general remain the same so long as the relationship between the cam edge and the points of engagement with the follower remains the same as described herein. Changing only the shape of the cam riding within the square-shaped follower will produce generally the same character screen motion although the smoothness of motion may vary with the cam shape.

The nature of the path of motion of a point on the screen may, of course, be of a closed type other than circular, as described, cf. elliptical. Attainment of such a motion may be accomplished with a cam and follower arrangement of the general type disclosed by retaining the circular cam shape but changing the shape of the follower so as to change the relationship as between the cam surface and the points of its engagement with the follower. Of course, short of actually changing this relationship, the follower shape may be varied from a square to a triangle or other suitable polygon, or even circular shape, to produce the described circular path of screen motion.

One of the extremely advantageous features of the invention is that the components of the illustrative flour sifter are quickly and easily disassembled for cleaning with even more facility than with cleaning of manual type sifters which are in common use today. Simple removal of the motor and switch housing 26 from the canister 22 permits complete immersion, if desired, of the canister in wash water. To dismantle the components for cleaning, the spring clip fastening member 56 which holds the housing 26 to the canister is unhooked from the housing and allowed to swing downwardly about the canister pivots 58. Then the lower portion 26a of the housing is grasped manually and swung outwardly toward the handle in a short arc until the cam 102 passes outwardly through and is clear of the canister opening 105. At this point the locating ribs 52 on the housing 26 have been disengaged from the canister ridges 54. The housing 26 may then be bodily moved downwardly from the canister until the switch button 38 is clear of the underside of the sifter handle 24. If desired, further disassembly may be accomplished by removing the screen 72 and some of its supporting parts from the canister. This is done by manually unscrewing the thumb-nut 96 from the extreme upper portion of the stud 84, then grasping the circular cap 94 and lifting the unitary cap, compression spring 92 and screen 72 upwardly off from the stud 84 and clear of the canister.

After washing, the reverse procedure is used for assembly of the parts. First, the screen 72 is repositioned on the supporting stud 84 with the cam follower 104 positioned downwardly. The flat 106 on the stud and the half-moon opening 108 in the cap 94 assure orientation of the cam follower 104 directly opposite the opening 105 in the canister. Next, the upper end of the motor and switch housing 26 is nested under the canister handle 24 so that the switch button 38 fits into the handle recess 46. Then slight swinging movement of the lower end 26a of the housing inwardly toward the canister is effective to cause the cam 102 to pass through the canister opening 105 and into operative engagement with the follower 104 carried by the screen 72. The cooperating ribs 52 and 54 on the housing and canister, respectively, assure proper aligned positioning of the housing with respect to the canister. Finally, the spring clip 56 is swung upwardly so as to resiliently engage the bottom of the housing 26 and thereby hold it fast against the canister.

It is found that by use of the present invention an unusually high degree of flour aeration is attained, and in a minimum length of time. In one series of experiments, upwards of 30 different samples of flour for household use and in the condition found in conventional commercial flour bags found on grocery shelves were sifted through a flour sifter constructed in accordance with the invention. It was found that the apparent density of the resulting aerated or sifted flour was between 104 and 108 grams per standard kitchen measuring cup volume, or appreciably lower than that obtained using other type sifters which are presently commercially available. Moreover, a full 5-cup canister of compacted flour was completely sifted in about 35 seconds time, or less than about 6 seconds per cup of sifted flour obtained, a speed that was unattainable using other types of flour sifters that are available.

Another advantageous feature of the invention resides in the elimination of a motor mounting or other obstruction placed within the canister and over the sifting screen. The mounting of the illustrative motor outside of the canister permits use of a minimum size canister since virtually the entire canister volume may be filled with flour and, importantly, a minimum diameter sifting screen may be employed. One practical result of this arrangement is that the sifter discharges aerated flour directly into a measuring cup or the like, thus eliminating messy and untidy conditions wherein flour is scattered about the table top or work bench.

A further highly advantageous feature of the invention resides in the use therein of an extremely small sized electric motor, which as shown is only about $\frac{1}{100}$ H.P. and which facilitates compactness, low-cost and portability of the sifter.

The illustrative flour sifter is also not dependent upon precisely machined and close fitting components, and is thus largely free of mechanical trouble necessitating repairs as well as being quiet in operation. Moreover, the illustrative cam and follower arrangement permits repeated stop-start operation without bringing about excess wear on the driving and driven parts.

I claim as my invention:

1. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, means for imparting to said screen oscillatory motion in a substantially horizontal plane about said central screen supporting means and for superimposing on said horizontally oscillating screen a tilting motion about said central screen supporting means whereby the screen is successively tilted into planes skewed with the horizontal, said last-mentioned means including a rotatable shaft having an eccentric element engaging and cooperating with said screen.

2. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, means for imparting to said screen oscillatory motion in a substantially horizontal plane about said central screen supporting means and for superimposing on said horizontally oscillating screen a tilting motion about said central screen supporting means whereby the screen is successively tilted into planes skewed with the horizontal.

3. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, means for imparting to said screen oscillatory motion in a substantially horizontal plane about said central screen supporting means and for superimposing on said horizontally oscillating screen a tilting motion about said central screen supporting means whereby the screen is successively tilted into planes skewed with the horizontal, said last-mentioned means including a rotary eccentric plate cam disposed within a closed loop cam follower secured to the screen.

4. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, means for imparting to said screen oscillatory motion in a substantially horizontal plane about said central screen supporting means and superimposing on said horizontally oscillating screen a tilting motion about said central screen supporting means whereby the screen is successively tilted into planes skewed with the horizontal, said last-mentioned means including a rotary eccentrically mounted circular plate cam disposed within a substantially square shaped closed loop cam follower secured to an outer edge of the screen.

5. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, means for imparting to said screen oscillatory motion in a substantially horizontal plane about said central screen supporting means and for superimposing on said horizontally oscillating screen a tilting motion about said central screen supporting means whereby the screen is successively tilted into planes skewed with the horizontal, said last-mentioned means including a rotary eccentrically mounted circular plate cam disposed beneath the screen and arranged within a substantially square shaped closed loop cam follower dependingly secured to an outer edge of the screen.

6. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for resiliently supporting the central portion of said screen in the canister to afford limited movement of the screen with respect to the support means, and means for imparting to the screen oscillatory movement in a substantially horizontal plane about said central support means as well as tilting movement in planes askew to the horizontal, said last-mentioned means comprising a U-shaped member secured to said screen with the open portion of the U against the screen to thereby define therewith a closed approximately square-shaped opening, a cam element sized to fit into and engage the interior of said opening, and means for imparting rotary eccentric motion to said cam element whereby the screen simultaneously undergoes oscillatory motion in a substantially horizontal plane and tilting motion askew with the horizontal.

7. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for resiliently supporting the central portion of said screen in the canister to afford limited movement of the screen with respect to the support means, a stirrup secured in depending relation to the periphery of said screen and in substantial normal relation to the plane of the screen with the open portion of the stirrup arranged against the screen to thereby define therewith a closed approximately square-shaped follower loop, a disc shaped plate cam sized to fit into said approximately square-shaped follower in approximate coplanar relation therewith, and means for imparting rotary eccentric motion to said cam whereby any point on the plane of said screen undergoes motion in a substantially circular path oriented in a substantially vertical plane.

8. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, and means for imparting to said screen oscillatory motion about said central screen supporting means in a horizontal plane and in planes slightly displaced from the horizontal whereby any point on the plane of said screen undergoes motion in a substantially circular path oriented in a substantially vertical plane.

9. A flour sifter comprising, in combination, a generally circular canister having upper and lower portions, the upper portion providing a canister inlet and constituting a hopper for holding flour or the like and the lower portion providing a canister outlet, a substantially flat, circular screen horizontally disposed in the lower portion of the canister, means for supporting the central portion of said screen in said lower portion of the canister while yet permitting limited movement of the screen with respect to the support means, and means including a rotatable shaft having an eccentric element engaging and cooperating with said screen for imparting to the screen oscillatory motion about said central screen supporting means in a horizontal plane and in planes slightly displaced from the horizontal whereby any point on the plane of said screen undergoes motion in a substantially circular path oriented in a substantially vertical plane.

References Cited in the file of this patent

UNITED STATES PATENTS

| | | |
|---|---|---|
| 551,308 | Draver | Dec. 10, 1895 |
| 1,586,974 | Devlin | June 1, 1926 |
| 1,808,426 | McCormick | June 2, 1931 |
| 2,642,992 | Winn | June 23, 1953 |
| 2,765,080 | Balmer et al. | Oct. 2, 1956 |

FOREIGN PATENTS

| | | |
|---|---|---|
| 9,956 | Great Britain | 1906 |